United States Patent

[11] 3,631,488

[72] Inventor Norol T. Evans
San Pedro, Calif.
[21] Appl. No. 427,332
[22] Filed Jan. 22, 1965
[45] Patented Dec. 28, 1971
[73] Assignee Hughes Aircraft Company
Culver City, Calif.

[54] DIGITAL MOVING TARGET INDICATOR CANCELLATION SYSTEM
11 Claims, 9 Drawing Figs.

[52] U.S. Cl. .................................................. 343/7.7,
343/5 DP
[51] Int. Cl. .................................................. G01s 9/42
[50] Field of Search .......................................... 343/5 DP,
7.7

Primary Examiner—Malcolm F. Hubler
Attorneys—James K. Haskell and Walter J. Adams ABSTRACT: This invention relates to moving target indicator systems for determining the presence of moving targets with a radar system and particularly to an improved and highly reliable digital moving target indicator cancellation system.

INVENTOR
NOROL T. EVANS,
BY
Walter J. Adam
ATTORNEY.

FIG. 5.

DIGITAL MOVING TARGET INDICATOR CANCELLATION SYSTEM

Conventional moving target indicator (MTI) cancellation units obtain the video output signals from the phase detector of the MTI receiving channel and apply them through both a delayed channel and an undelayed channel, the delay being the exact reciprocal of the radar pulse repetition frequency. The analog output signals of these two channels are then subtracted to develop the MTI residue which is the first difference amplitude between two sequential range sweeps. A double cancellation unit would then apply the MTI residue from the first and second sweeps through a delayed and undelayed channel to obtain the second difference value. These analog MTI units have the disadvantages that the delayed and undelayed channels both modify and distort the signal in an independent manner and that the timing control of the delay channels varies so as to be difficult to maintain the system in adjustment. Also, triple cancellation analog units have been found to be substantially unreliable because all alignment inaccuracies and errors are cumulative. It would be highly useful to the radar and display art if a moving target indicator system were developed that operated in a continuous manner with digital and quantizing techniques so as to eliminate the difficulties of time control of analog delay lines.

It is therefore an object of this invention to provide a moving target indicator cancellation unit that accurately and reliably cancels video signals substantially without time alignment problems.

It is a further object of this invention to provide a highly reliable digital moving target indicator system.

It is a still further object of this invention to provide a digital moving target indicator system that operates with a magnetic binary storage system.

It is another object of this invention to provide a digital moving target indicator system that will provide a plurality of higher order video difference signals without affecting the reliability of the cancellation operation.

It is still another object of this invention to provide a digital moving target indicator system including a core memory and that operates in a continuous and sequential manner.

Briefly, the moving target indicator system in accordance with the principles of the invention responds to the radar video signal during each radar range sweep to develop binary numbers each representative of the amplitude of the video signal received during a different range interval count. Each digital video number is applied to a first difference subtractor in conjunction with the digital video number stored in a memory during the same range bin count of the previous range sweep and transferred to a read register. The first difference signal developed in the first subtractor and a first difference signal delayed after being read from memory at the previous range count are applied to a second difference subtractor to develop a second difference signal. A memory read address counter and a write address counter respond to the memory range counter so that reading is performed at a first word address and writing is performed at a subsequent word address in memory during each read-write cycle, each word corresponding to a predetermined range interval. In order to maintain continuous operation, the digital numbers written into memory during one range sweep period are read out from memory at an earlier range counter time during the subsequent range sweep period. The second difference signal is applied to a binary threshold circuit to determine the presence of a moving target.

The novel features of this invention, as well as the invention itself, both as to its organization and method of operation, will best be understood from the accompanying description, taken in connection with the accompanying drawings, in which like reference characters refer to like parts, and in which.

Figure 1:
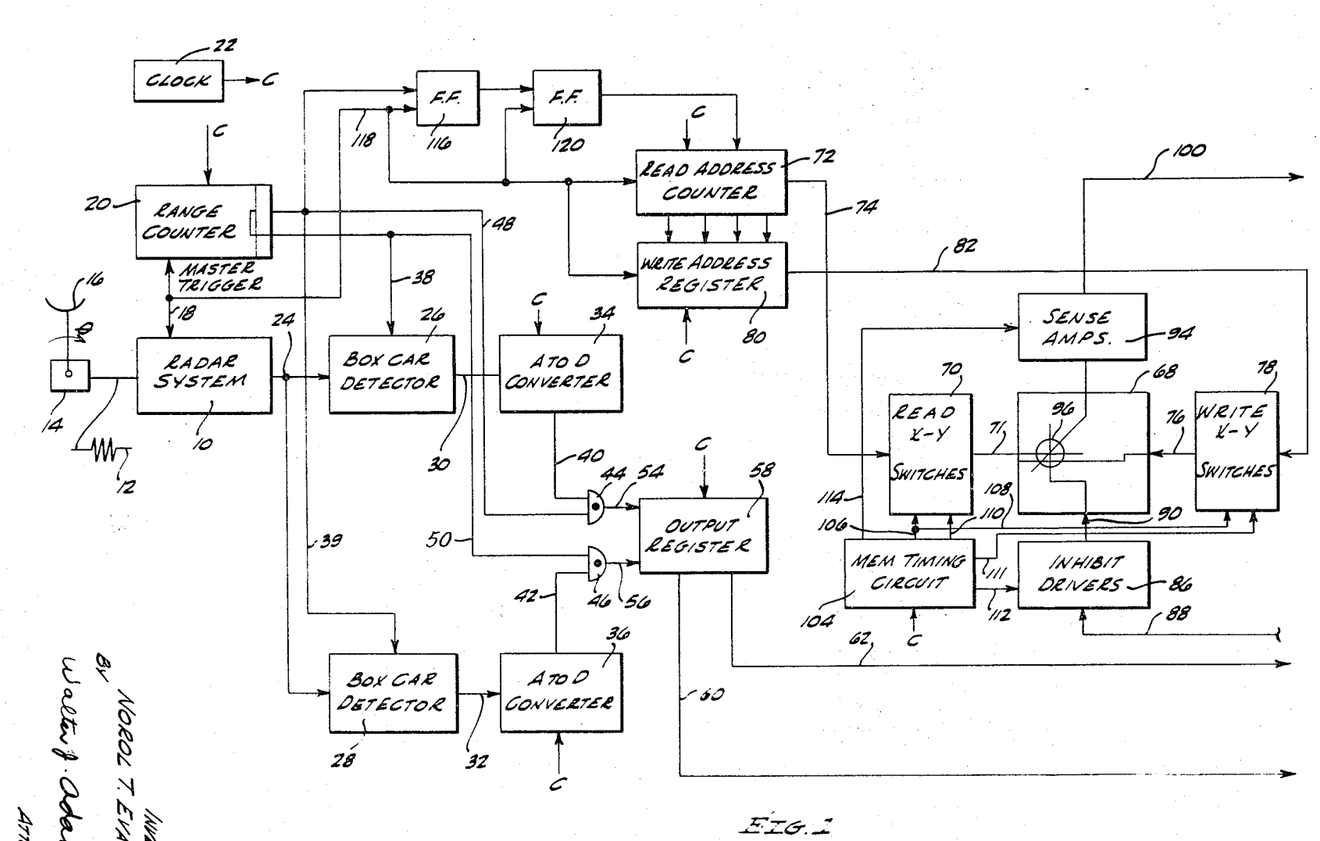
FIG. 1 is a schematic block and circuit diagram of a first portion of the digital moving target indicator cancellation system in accordance with the principles of the invention.

Referring first to FIG. 1, the digital moving target indicator (MTI) system in accordance with the principles of the invention responds to a radar system 10 which in synchronism with a master trigger signal derived from a range counter 20 applies pulses of energy of a waveform 12 to an antenna system 14 which may include a rotating surveillance antenna 16, for example, continually rotating in a horizontal plane. The pulses of energy of the waveform 12 are transmitted into space from the antenna 16 and are intercepted thereby after being reflected from objects in space such as aircraft. The antenna 16 rotates at a relatively slow rate so that a pulse is transmitted and reflections are received effectively at incremental positions of an azimuth angle $\theta$. The master trigger signal may be developed by suitable "AND" gates (not shown) when the repetitive counter 20 is reset at the end of each range count, and may be applied to the magnetron (not shown), for example, of the radar system 10. The range counter 20 for example, may be a Mod 1024 counter to define 1024 range bins or intervals in space from which reflected energy may be received by the antenna 16. A clock 22 which may be crystal controlled, for example, applies clock pulses to the flip-flops throughout the system as well as to the counting flip-flops of the range counter 20. The video return signal at video frequency which may be developed in the radar system 10 by mixers and envelope detectors in a conventional manner is applied through a lead 24 to box car detectors 26 and 28 and in turn through leads 30 and 32 to respective analog to digital converters 34 and 36. It is to be noted that the MTI system in accordance with the invention is operable when the radar system 10 is either a coherent or a noncoherent type. The box car detectors 26 and 28 may be of a conventional bipolar type utilizing a bidirectional switch such as shown on page 519 of Waveforms by Chance, Hughes, MacNichol, Sayre and Williams, Volume 19, Radiation Laboratory Series, McGraw Hill Book Company, each responding to a timing pulse on respective leads 38 and 39 for being charged during alternate range counts to the average amplitude of the video signal on the lead 24. It is to be noted that the leads 38 and 39 are derived from opposite output terminals of the least significant flip-flop of the range counter 20 so that one detector is being rapidly discharged and charged to a new value while the charge in the other is being held or maintained for that clock period. The analog to digital converters 34 and 36 may be of any conventional type responsive to clock pulses and may include a cumulative storage register responsive to clock pulses as is well known in the art. The binary numbers each representing the digital video amplitude of the signal received during a range bin interval are applied from the analog to digital converters 34 and 36 through composite leads 40 and 42 to a plurality of respective "AND"-gates 44 and 46 which also respond to signals on leads 48 and 50 developed by the least significant flip flop of the range counter 20 so that a digital video number is only passed from each converter during alternate range counts. It is to be noted that the digital video numbers may each include eight bits so that each of the composite leads 40 and 42 includes eight leads which are coupled to eight individual "AND" gates. The digital video signals applied to the gates 44 and to the gates 46 are passed through respective composite leads 54 and 56 to an output register 58 which may include eight flip-flops controlled by the clock pulse C from the system clock 22. The eight binary bits of the digital video number are applied from the output register 58 through eight leads such as 60 and 62 to the eight most significant flip-flops of a write register 64 for being clocked therein at the next clock pulse. The video signals on the leads such as 60 and 62 are applied to the first difference subtractor 66 prior to the clock pulse entering the signals into the write register 64 to provide continuous operation, as will be explained subsequently. It is to be noted at this time that the video signal on the lead 24 is delayed one clock period during charging of the box car detector such as 26, is delayed one clock period on the A to D converter such as 34 and is delayed one clock period in the output register 58 before being clocked into the write register 64.

Figure 9:
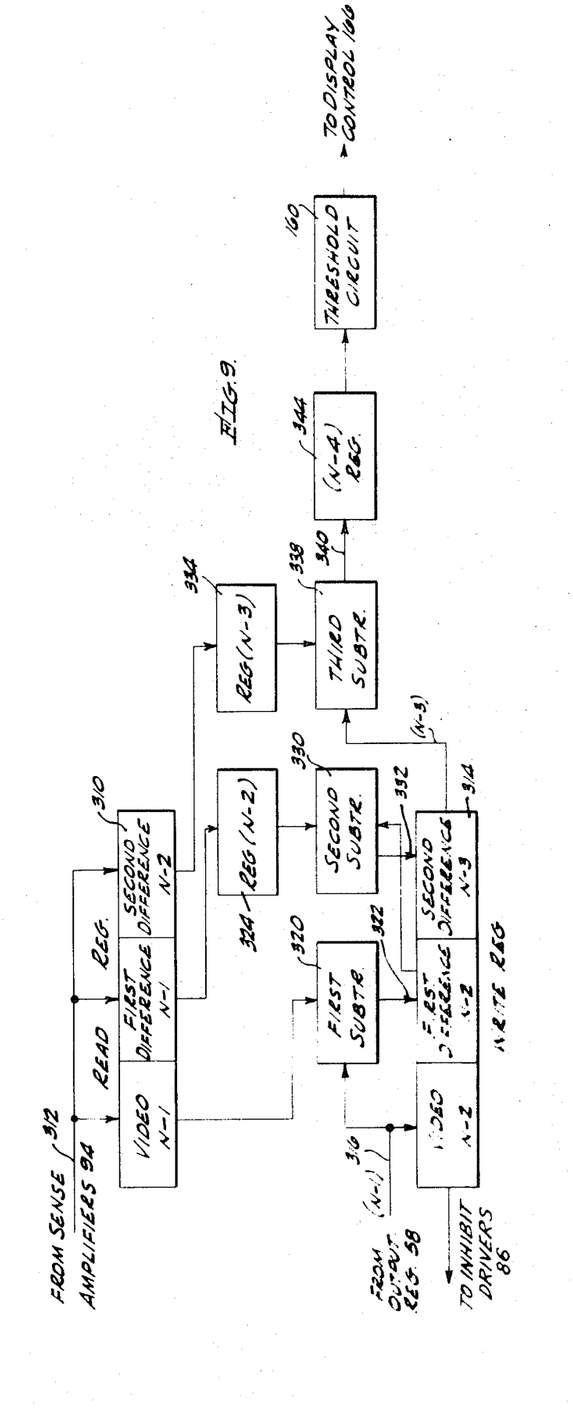
FIG. 9 is a schematic block diagram of a higher order moving target indicator cancellation system in accordance with the principles of the invention.

The system storage is provided by a magnetic core memory array 68 which, for example, may include 1024 16-bit word positions, each word corresponding to one of the 1024 range intervals defined by the range counter 20. In a higher order cancellation system such as shown in FIG. 9, each word position may store 24 bits, for example. The memory array 68 which may contain cores such as 96 responds during reading to read X-Y switching circuits 70 which decode a read address developed by a read counter 72 and applied through a composite lead 74 to the switching circuit 70. During writing, the memory responds to signals applied on a composite lead 76 from a write X-Y switching circuit 78 in response to the address developed by a shift register 80 and applied through a composite lead 82 to the switching circuit 78. The write address counter 80 may be a parallel shift register receiving the count in the read counter 72 after a one clock period delay. In some arrangements in accordance with the invention, the register 80 may be a separate write address counter. It is to be noted at this time that the reading is performed during each clock period at a higher numbered word address than the address utilized for the word address for writing during the same clock time. An inhibit driver circuit 86 responds to signals on a composite lead 88 derived from the 16 flip-flops of the write register 64 to apply inhibit signals for preventing the writing of a "one" in selected cores through a composite lead 90 to the memory array 68. Sense amplifier circuits 94 which may include 16 individual sense amplifiers respond to signals developed by the cores such as 96 of the memory array 68 to apply signals, which may have a negative polarity for example, through a composite lead 100 to 16 storage flip-flops of a register 102. In order to control the timing of the memory operation so that a read and write cycle are both performed during each system clock interval, a memory timing circuit 104 responsive to clock signals C applies timing pulses through a lead 106 to the switching circuit 70, through a lead 108 to the switching circuit 78, through a lead 110 to the switching circuit 70, through a lead 112 to the inhibit driver circuit 86, through a lead 111 to the write switching circuit 78 and through a lead 114 to the sense amplifier circuit 94.

Because of a processing delay in the system as will be explained subsequently, flip-flops 116 and 120 respond to the master trigger signal on a lead 118 to be reset at the start of each range sweep and the flip-flop 116 responds to the change of state of the least significant flip-flop of the range counter 20 to apply a delayed signal from the flip-flop 120 to the read address counter 72 for triggering the initial starting count thereof. Thus, a two clock period delay is provided between the range counter 20 and the starting of the read address counter 72. In order to provide an additional one clock period delay for the write address counter 80 during each range sweep interval, the output of the read address counter 72 is shifted into the corresponding flip-flops of the write address register 80 at each clock time. The read address counter 72 and the write address counter or shift register 80 are also reset by the master trigger signal on the lead 118 at the start of each range sweep. By providing the one count difference between counters 72 and 80, reading at each word address of the memory array 68 is performed one clock time earlier than is writing at that word address.

The memory system of the invention operates in a conventional manner during reading and writing to switch all addressed cores of a word position which may include cores such as 96 in a binary "one" state to the "zero" state in response to half amplitude current pulses coincident at the cores of a selected word position. The half amplitude current pulses are applied through drive leads such as 71 and 76. During writing, all cores of an addressed word are switched to the "one" state except those in which a half amplitude current is applied from the inhibit driving circuit 86 through the drive lead such as 90 to inhibit the writing of a "one." The inhibit drivers 86 are controlled by the information stored in the write register 64. The memory array 68 may have either a coincident current arrangement or a word organized arrangement as are well known in the art. Also, the concept of the invention includes other types of memory systems such as thin film magnetic memories, capacitive-type memories or magnetostrictive delay line memories.

Figure 2:
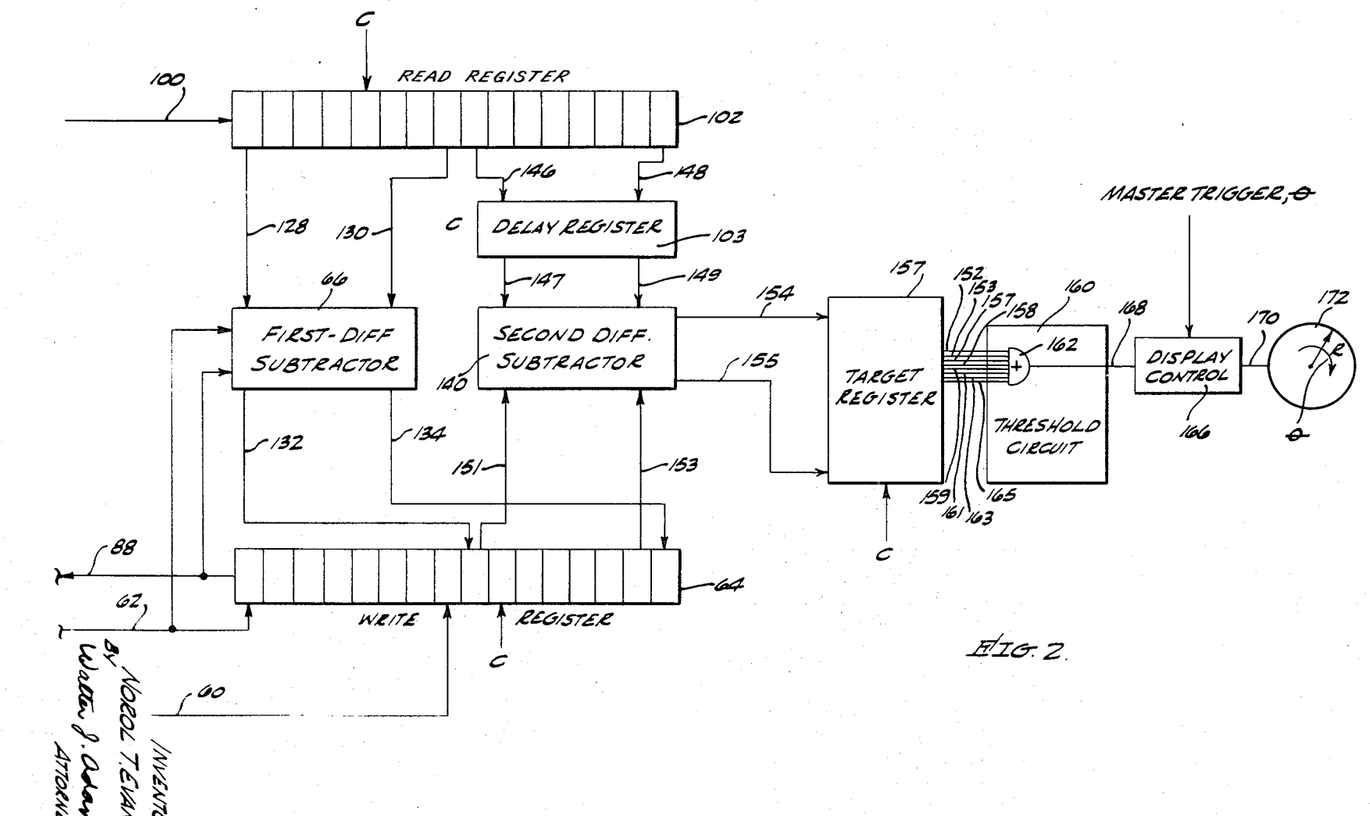
FIG. 2 is a schematic block and circuit diagram of a second portion of the digital moving target indicator cancellation system in accordance with the principles of the invention.

The first difference subtractor 66 responds during any clock period or range count to the digital video number presently in the output register 58 which is data from a range bin at clock time N, for example, and to the digital video number read during that range count period from the memory array 68, stored in the eight least significant flip-flops of the read register 102 and applied thereto through leads such as 128 and 130. The first difference value developed by the subtractor 66 is applied through leads such as 132 and 134 to input gates of eight flip-flops of the write register 64 for being clocked into the register at the next clock pulse so as to be written into the addressed word of the memory array 68 during the write cycle of the succeeding clock period. Also, the first difference number read from memory into the least significant eight flip-flops of the read register 102 is applied through leads such as 146 and 148 to the input gates of a delay register 103 for being written therein at the next clock pulse. A second difference subtractor 140 responds to the first difference number stored in the delay register 103 from data at clock time (N−1) and to the first difference signal of (N−1) data stored in the write register at the previous clock pulse and applied to the subtractor 140 through leads such as 151 and 153, to develop a second difference number. The second difference video number which may have a substantially large value for indicating a moving target is applied through leads such as 154 and 155 to a target register 157 which may include eight flip-flops, and after a one clock period delay to a threshold circuit 160. For example, if a second difference of 00000011 is selected as the threshold value to represent a moving target, the leads 152, 153, 157, 158, 159, 161, 163 and 165 may be applied to an "OR"-gate 162 which develops a signal when the signal on any of the input leads is true or "one." It is to be noted that other threshold arrangements may be utilized in accordance with the invention such as providing a subtraction operation from a fixed binary value. A signal developed by the threshold circuit 160 representative of a moving target is then applied either to a display control circuit 166 through a lead 168 and through a composite lead 170 to a cathode ray tube display 172 which may provide indications of a moving target at each range sweep as a function of azimuth angle $\theta$ or to an automatic detection device using a moving window detector. It is to be noted that it is well known in the art that the display control 166 may also respond to the azimuth angle $\theta$ developed by the radar system 10 as well as to the master trigger signal on the lead 18. The parallel difference subtractors 66 and 140 may be, in accordance with the principles of the invention, any conventional arrangement such as shown on pages 525 to 528 of the book, "Digital Computer and Control Engineering," Robert S. Ledley, McGraw Hill Book Company, copyrighted 1960, or may be arithmetic-type units utilizing a parallel adder responding to the $2^s$ complement of the subtrahend.

Figure 3:
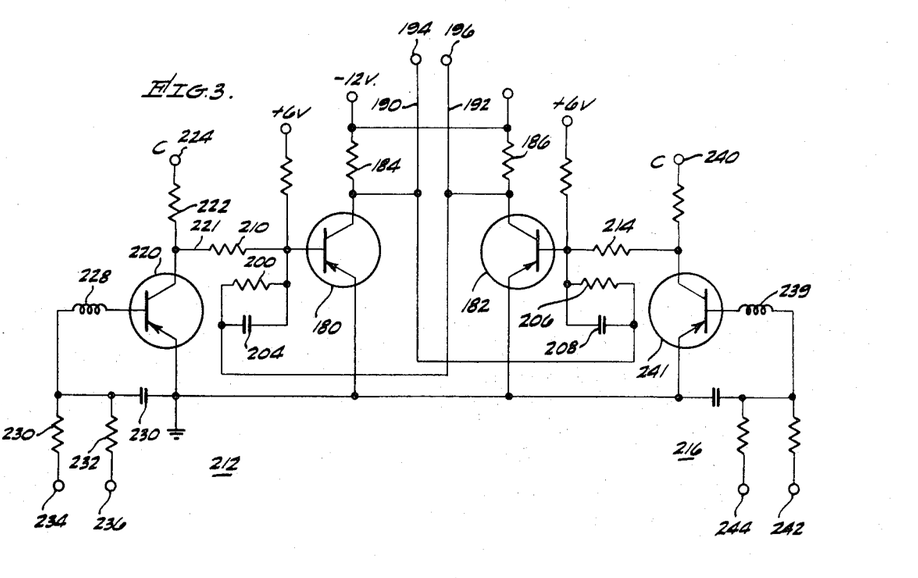
FIG. 3 is a schematic circuit diagram of a typical flip flop that may be utilized in the system of FIGS. 1 and 2.

Referring now to FIG. 3, a typical flip-flop circuit that may be utilized in the system of FIGS. 1 and 2 is shown to operate in response to NAND or negative "AND" logic, that is, when the input signals to a gate are all true the output signal from that gate is false and when any of the input signals to that gate are false, the output signal from that gate is true. The flip-flop, for example, may respond to and develop logical levels of 0 volts or ground for a true signal and −8 volts for a false signal. It is to be understood that the principles of the invention are not to be limited to any particular type of logic or to any specific signal levels as either "NOR" or conventional "AND" and "OR" logic may be utilized with any selected binary signal levels, within the scope of the invention. Transistors 180 and 182 of the PNP-type are provided with emitters coupled to ground and collectors coupled through respective resistors 184 and 186 to a suitable source of potential such as a −12 volt terminal 188. The collectors of the transistors 180 and 182 are coupled to respective leads 190 and 192 which are in turn coupled to true and false output terminals 194 and 196. The base of the transistor 180 is coupled through a cross-coupling circuit including a parallel arranged resistor 200 and capacitor 204 to the lead 192 and the base of the transistor 182 is coupled through a cross-coupling circuit including a parallel arranged resistor 206 and capacitor 208 to the lead 190. The base of the transistor 180 is also coupled through a resistor 210 to a "NAND"-gate 212 and the base of the transistor 182 is coupled through a resistor 214 to a "NAND"-gate 216. The "NAND"-gate 212 includes a PNP-type transistor 220 having an emitter coupled to ground, a collector coupled through a resistor 222 to a clock pulse terminal 224 and coupled through a lead 221 to the resistor 210. The base of the transistor 220 is coupled through an inductor 226 to a summing point 228 which in turn is coupled through a capacitor 230 to ground as well as through resistors 230 and 232 to input terminals 234 and 236. The inductor 226 provides a delay of the incoming signal so that information may be read from the flip flop and written into the flip-flop in response to the same clock pulse, that is, to provide an antirace feature to the flip-flop. The "NAND"-gate 216 is similar to the gate 212, having a clock pulse terminal 240 and input terminals such as 242 and 244 and an inductor 239.

In response to two input signals being true at 0 volts applied to the terminals 234 and 236, the transistor 220 is maintained biased out of conduction and a negative clock pulse applied to the terminal 224 biases the transistor 180 into conduction to apply a true or ground level signal to the false output terminal 194. At the same time a signal substantially at ground potential is applied to the lead 192 to bias the transistor 182 out of conduction. It is to be noted that in this state, the transistor 241 is maintained biased in conduction by the applied logical signals so that a clock pulse at the terminal 240 is passed to ground and does not change the state of the flip-flop. When the flip-flop of FIG. 3 functions in the read register 102 of FIGS. 1 and 2, each of the output leads 100 from the sense amplifier 94 is coupled to a terminal of a flip-flop such as the terminal 194 for triggering the flip-flop to the true state between clock pulses and ground potential is maintained at the terminals 234, 236, 242 and 244 so that the flip-flop is reset at the next clock pulse applied only to the terminal 240. For other "NAND" gates utilized in the illustrated systems in accordance with the invention, a gate such as 212 may have the terminal 224 coupled to a −8 volt potential and the inductor 226 may be omitted. Thus, only when all signals applied to the input terminals 234 and 236 are at a true or ground level is the transistor 220 biased out of conduction and a −8 volts or false signal applied to the output lead 221. It is to be again noted that within the principles of the invention, other types of flip-flops and logical operation such as "NOR" logic or conventional "AND" and "OR" logic may be utilized.

Figure 4:
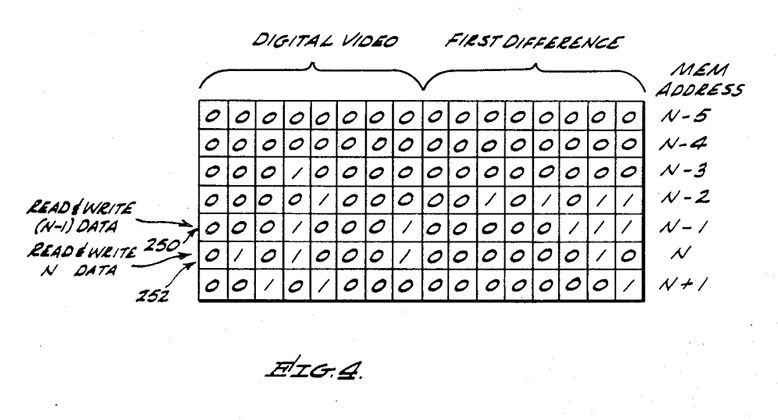
FIG. 4 is a schematic diagram of a portion of the magnetic core memory that may be utilized in the system of FIGS. 1 and 2.

Referring now to FIG. 4 showing a portion of the memory array 68 in schematic form, each word position of the memory which includes 16 magnetic cores, for example, may be assigned an address equal to the count of the range counter 20 during the range count when the data stored therein was present on the lead 24 (FIG. 1). The first eight positions of each word may store the digital video signal derived from the corresponding range interval and the second eight positions of each word may store the first difference value derived from a subtraction of the digital video signals derived from the same range interval from two sequential range sweeps. A digital video number 250 which is recorded in memory location (N−1) may have a value 00010001 representative of the amplitude of a target return. The first difference at the same memory location may have a value 00000111 indicating that the target is moving, that is, total cancellation is not provided. A digital video number 252 stored in a memory word location N may have a relatively large value 01010001 indicating the amplitude of the video return from clutter such as clouds in space. However, because of the cancellation operation the first difference number of the word 252 may have a value of 00000010. After the second cancellation, the second difference number from clutter may have a value 00000001, for example. Each word position of the memory of FIG. 4 stores the digital video number and the first difference number for a predetermined range bin or interval. For example, the word at memory address N is data derived from video information received at the range bin interval defined by range count N during the present range sweep and the previous range sweep.

Figure 5:
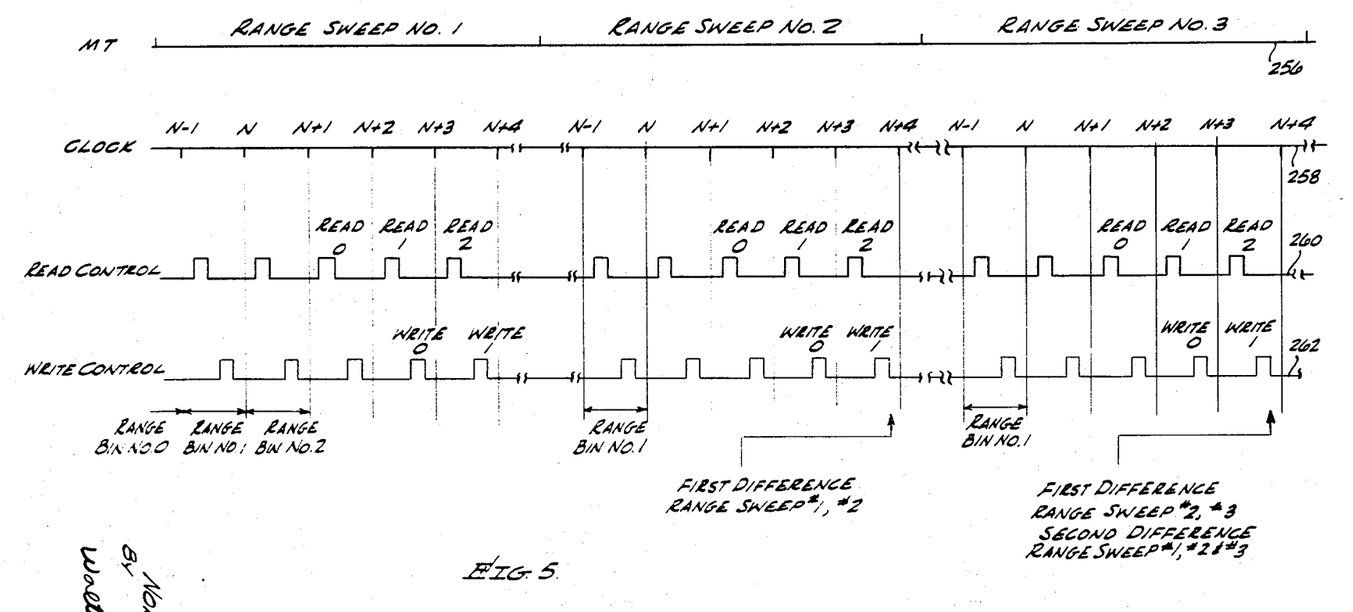
FIG. 5 is a schematic diagram of waveforms showing voltage amplitude as a function of time for explaining the operation of the system of FIGS. 1 and 2 during a plurality of range sweeps.

Referring now to FIG. 5 as well as to FIGS. 1 and 2, the general operation of the MTI system will be explained in further detail. During each range sweep interval as defined by the master trigger signals of a waveform 256, the range counter 20 responds to the clock signals of a waveform 258 to count a selected number of range intervals or bins such as 1024, for example. Although only range counts (N−1) to (N+4) are shown during each range sweep interval where N is a selected number for illustrative purposes, it is to be understood that any desired number of range bins such as 1024 are defined during each range sweep period. For convenience of explanation, video information in the range bin during range clock (N−1) will be defined as range bin number 1, that is, video information in range bin number 1 is received during range count interval (N−1). During the read portion of the range count interval (N+2) of range sweep number 1, the digital video stored in the memory from a previous range sweep is read from memory location N−1 as explained relative to FIG. 4, and during the write portion of the range count (N+3) the digital video number derived from range sweep number 1 is written into memory location (N−1) of FIG. 4. Reading and writing during each clock interval is controlled by respective read control pulses of a waveform 260 and write control pulses of a waveform 262 which correspond to respective sense enable and write control pulses of FIG. 7. During range sweep number 2, the digital video number and the first difference number representing data from range bin 1 and recorded in memory location (N−1) is read from memory into the read register 102. During range count (N +3) of range sweep number 2, the digital video received during range bin 1 of range sweep number 2 as well as the first difference signal developed from data of range sweeps numbers 1 and 2 are written into memory location (N−1). Thus the selected delays of generating the read and write addresses maintains all data relative to each range bin in a specific word position in memory. The reading and writing sequence of numbers of adjacent range bins is continuous, range bin 0 being read from memory in range sweep number 2 during range count (N+1) and the digital video of range bin 0 from range sweep number 2 and the first difference signal form range sweeps numbers 1 and 2 being written into memory during the write portion of range count (N+2). During the read portion of each range count, the second difference value is also developed from the first difference value developed and stored during the previous range sweep and from the first difference value developed in the present range sweep, that is, the second difference number is developed from the data of three sequential range sweeps.

During range sweep number 3, the digital video number and the first difference number developed in range sweep number 2 for range bin 1 is read at range count (N+2) from memory location (N−1). The digital video received in range bin 1 in range sweep number 3 as well as the first difference signal developed during that range sweep period is written into memory at range count (N+3) at memory location N. Thus during each range count interval, a word is read from a first memory location and a word is written into the previous memory location. The information data from a selected range bin is always written into memory during a first range count period and read from memory during a previous range count period of the next range sweep interval at the same word address.

Figure 6:
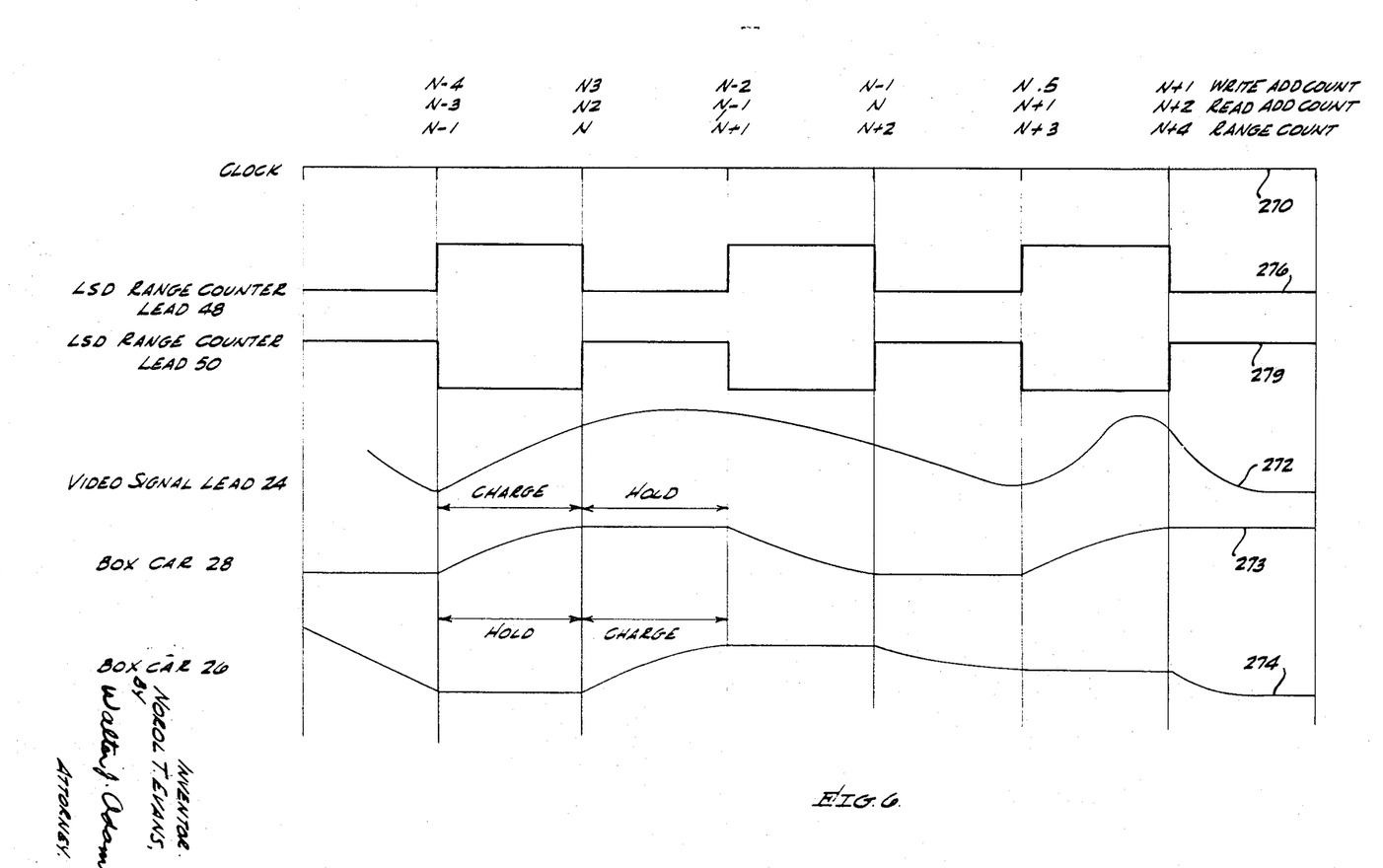
FIG. 6 is a schematic diagram of waveforms showing voltage amplitude as a function of time for further explaining the operation of the system of FIGS. 1 and 2.
Figure 7:
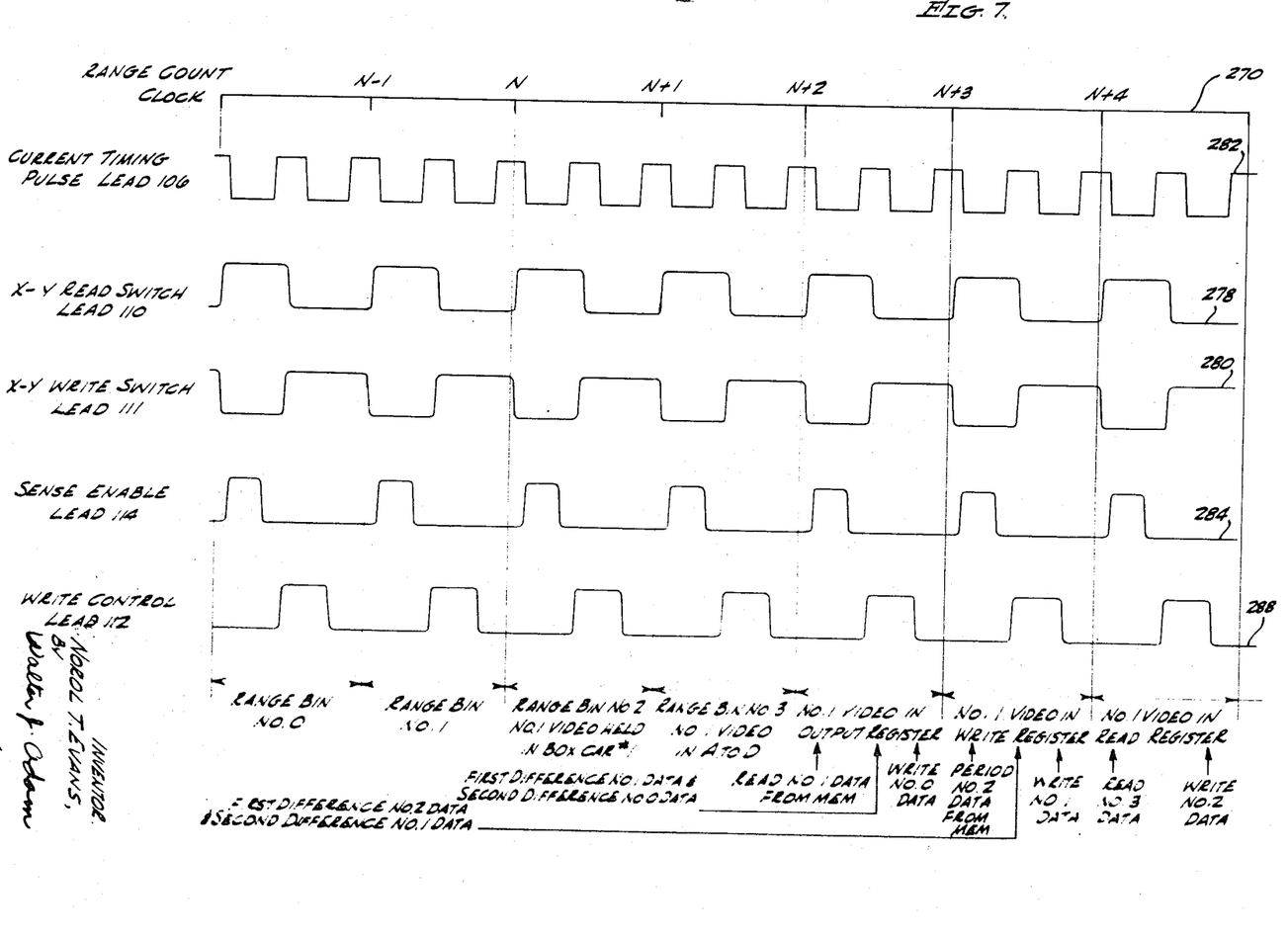
FIG. 7 is a schematic diagram of waveforms showing voltage amplitude as a function of time for further explaining the operation of the memory system of FIGS. 1 and 2.

Referring now to the waveforms of FIGS. 6 and 7 as well as to FIGS. 1 and 2, the range counter 20 defines the range bins or range intervals such as (N−1), N, (N+1), (N+2), (N+3) and (N+4) at corresponding clock signals of a waveform 270. The counts of the read address counter 72 and of the write address register 80 corresponding in time is respectively 2 and 3 counts or range intervals delayed from the range count as provided by the delay in the flip-flops 116 and 120 and the one clock period delay between the read address counter 72 and the write address register 80. Thus, the delay in the digital video path between the lead 24 and the write register 64 and the operation to read data of each range bin one clock period earlier than writing that data into memory is compensated by the starting count of the read address counter and the write address register. The video signal on the lead 24 as shown by a waveform 272 is applied to the box car detectors 26 and 28 and during range bin number 1 which is the range bin defined by range count (N−1) is gated into the detector 28 in response to a signal of the waveform 276 as developed from the true terminal of the least significant flip-flop of the range counter 20. Also during range bin interval (N−1) the signal from the false terminals of the least significant flip-flop of the range counter 20 as shown by a waveform 279 is at a low level and the box car detector 26 is holding or storing the charge developed during the preceding range bin interval. In a similar manner during range bin interval N, the detector 28 holds its charge and the detector 26 is charged to a new value as determined by the video signal of the waveform 272. The video signal of the waveform 272 charging the detector 28 with range bin number 1 video or during range count N−1 is stored in the detector 28 during range count time N and is available at the output of the analog to digital converter 36 during range count time N+1. The video data derived from range bin number 1 is clocked into the output register 58 in response to the clock at range count N+2 and is clocked into the write register 64 in response to the clock at range count N+3. The video number from range bin 1 is then written into memory during the latter portion of the clock time defined by range count N+3 and during the succeeding range sweep period is read from memory during the first portion of clock time N+2.

The reading and writing during each clock period is controlled by an X-Y read switch pulse of a waveform 278 applied on the lead 110 to the read switching circuit 70 and by an X-Y write switch pulse of a waveform 280 applied on the lead 111 to the write X-Y switching circuit 78. A current timer pulse of a waveform 282 is applied on the lead 106 to both the read and write X-Y switching circuits 70 and 78 to pass current through one or the other to cores as selected by the address. During reading, a sense enable signal of a waveform 284 is applied on a lead 114 to the sense amplifier circuits 94 for passing signals derived from the interrogated cores to the read register 102. During writing, a pulse of a waveform 288 is applied through the lead 112 to the inhibit driver circuits 86 for controlling the timing of applying inhibiting pulses to the memory array 68 for inhibiting the writing of a "one," for example, as determined by the contents of the write register 64. Thus, during each clock period or range count period, the video information from the range bin received by the radar system three range periods earlier is read from memory and the video information received four range bins earlier is written into memory. The read address which is delayed two clock times from the range count and the write address which is delayed three clock times from the range count results in the information in range bin 1, for example, being read from memory and the information derived from range bin 0 being written into memory during the same clock or range count period.

Thus, at clock time (N+2), the information derived from range bin 1 is read from memory into the read register 102 and the digital video from range bin 1 in the output register 58 is applied to the first difference subtractor 66 which applies a first difference signal to the input gates of the write register 64 for being clocked into the flip-flop at the next clock pulse. At the same time, the first difference number in the delay register 103 which was developed during the previous range sweep and read from memory during the previous range bin interval is applied to the second difference subtractor 140 in combination with the first difference stored in the write register 64 and developed by the subtractor 66 during the previous clock period, to apply a second difference signal to the target register 157. At the same time the second difference developed during the previous clock period is applied to the threshold circuit 160 which at a selected threshold level applies a signal to the lead 168 and to the display 172 for indicating a moving target. Thus a total delay of four range bin intervals is provided between the radar system 10 and the display 172 which may be compensated by a suitable bias, as is well known in the art. During the write portion of the range count time N+2, the digital video and the first difference signal in the write register 64 which is range bin 0 data, is recorded in the memory array 68 at the address N−1 selected by the write address register or counter 80. In response to range count (N+3), the range bin 1 data is entered into the write register 64, the range bin 1 data in the read register 102 is entered into the delay register 103 and the second difference value of range bin 1 data is entered into the target register 157. During the next range count period (N+3), the video difference signal from range bin 2 is read from memory at the address (N+1) into the read register 102 and the first difference subtractor 66 applies a first difference signal to the input gates of the write register 64. Also during range count (N+3), the second difference subtractor 140 responds to the range bin number 1 data to apply a second difference number to the input gates of the target register 157. This second difference value is thus representative of targets occurring in range bin 1.

During the second portion of clock period N+3, the digital video and the first difference signal from range bin 1 in the write register 64 are written into memory at memory address (N−1). This operation continues in a similar manner with the video information processed during each range bin interval indicating the presence or absence of a moving target at the threshold circuit 160 from video information received by the radar system four range bin intervals previously in time. As discussed above, this offset in time may be controlled in the display system by a suitable bias or time delay.

Figure 8:
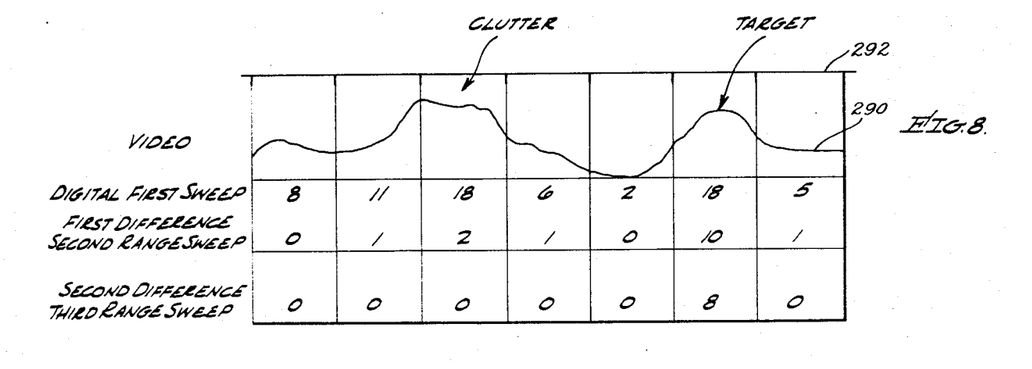
FIG. 8 is a schematic diagram of waveforms of voltage amplitude as a function of time for further explaining the operation of the cancellation unit of FIG. 1.

Referring now to FIG. 8, a video signal of a waveform 290 is shown as it may occur during one of a plurality of range intervals as defined by the clock pulse of a waveform 292. During a first range sweep the digital amplitude in adjacent range bins may have the decimal values 8, 11, 18, 6, 2, 18 and 5 with the values 18 representing both a clutter condition and a target condition. The first difference binary numbers developed by the subtractor 66 in corresponding range bins has decimal values 0, 1, 2, 1, 0, 10, 1 with the amplitude 10 representing incomplete cancellation during the two range sweeps from a moving target. It is to be noted that in the clutter region the digital values substantially cancel to an amplitude of decimal 1 or 2 because of the stationary characteristics thereof. During the third range sweep the second difference signal has substantially zero amplitude except during the range bin at which a target was present and has an amplitude of decimal 8. Thus the system in accordance with the principles of the invention may utilize a first difference, a second difference or any desired high order of difference to improve the reliability of the cancellation operation and the indication of a moving target. Because of the continuous sequential operation of the system of FIG. 1, substantially complete cancellation of nonmoving targets is provided with a relatively simple structural arrangement.

The systems in accordance with the invention operate with either coherent video signals or with noncoherent video signals. In radar systems that have log receivers or linear receivers with adequate instantaneous automatic gain control to prevent limiting, a pulse doppler or noncoherent MTI system may be utilized. The log or normal and unlimited video is sent directly to the box car detectors in this type of arrangement. However, a noncoherent system must have both clutter and a moving target present in a range bin to generate an output signal, as is well known in the art.

Referring now to FIG. 9, an arrangement is shown in accordance with the principles of the invention for developing a third difference value to be applied to the threshold circuit for even more efficient cancellation. The memory system of FIG. 1 including the array 68 are similar for this high order difference arrangement except each memory location and associated registers may have 24 bits storage capacity for the illustrated system utilizing eight binary bits in the digital or binary number. A read register 310 responds through a lead 312 to the interrogated signals of data received on the lead 24 at range count (N—1), stored in memory during the previous range sweep and strobed through the sense amplifiers 94. The read register 310 may include a first portion of eight flip-flops that stores the video signal of a range bin N—1, a second portion of eight flip-flops that stores a first difference signal of data from range bin N—1 and a third portion of eight flip-flops that stores the second difference signal developed from data of the range bin N—2. Similar to the arrangement of FIGS. 1 and 2, the information is read from memory into the read register 310 shortly after range count time (N+2). A write register 314 includes three portions, each of eight flip-flops responding to the video signal in the output register 58 on a lead 316 and during clock period N+2 maintaining the video signal from the range bin at range count time (N—2) stored therein, the first difference signal developed from data at the range bin of range count time (N—2) stored therein, and the second difference signal developed in the range bin of range count time (N—3) stored therein. The (N—1) range count video on the lead 316 is applied to a first subtractor 320 in combination with the video signal read from the sense amplifier and stored in the read register 310 to apply the first difference signal of (N—1) data to the input gates of the write register 314. The (N—2) and (N—3) data in the write register 314 is written into memory during the read portion of that range count time, and at the next clock signal at range count (N+3) the first difference of the N—1 data is entered from the first subtractor 320 through a composite lead 322 into the write register 314. During the range count period (N+2), the first difference signal developed from (N—2) data is applied from the read register 324 with the (N—2) data in the write register 314 to the second subtractor 330 to apply the (N—2) data second difference signal to the input gates of the write register 314 for being entered into the flip-flops at the clock of range count time (N+3). The second difference number from (N—3) data is also applied during range count period (N+2) to a third subtractor 338 to apply a third difference number to a composite lead 340 and to the input gates of a register 344 for being entered therein at the clock pulse at range count (N+3). At the clock pulse of range count (N+3), the first difference number in the read register 310 is entered into the register 324, the second difference number in the register 310 is entered into the register 334 and the third difference number on the composite lead 340 is entered into the register 344. Shortly after clock pulse (N+3), the register 344 thus contains data from the range bin at clock time N—3 which is applied to the threshold circuit 160 for indicating the presence of a moving target. The operation of the system of FIG. 9 is similar, except for the additional delays, to that of FIGS. 1 and 2 and will not be explained in further detail. It is to be noted that the principles of the invention are not limited to any particular number of orders of differences but are applicable to any desired degree of cancellation.

Thus there has been described a digital moving target indicator cancellation system in which the amplitude of the video signal in each radar pulse interval is quantized, processed to form a first difference number and stored for forming the first difference and second difference number during the next range sweep interval. The memory addressing is controlled so that during each range bin interval, the processing of video data from a predetermined previous range bin interval is completed and information is stored for processing at the previous range bin interval during the next range sweep period. Thus the continually operating digital MTI system operates with a minimum of adjustments to provide a highly effective cancellation operation and to reliably indicate the occurrence of moving targets in the presence of clutter such as clouds, chaff, ground return and sea return.

What is claimed is:

1. A moving target indicator system responsive to digital video data developed by radar means in each range interval of a plurality of range sweeps comprising
   a range counter for defining the range intervals during each range sweep,
   an output register coupled to said range counter and to the radar means for receiving the digital video data,
   a magnetic core memory having a word position corresponding to each of the plurality of range intervals,
   a read register coupled to said memory,
   a write register coupled to said memory and to said output register,
   a first difference subtractor coupled to said output register, to said read register and to said write register,
   a second difference subtractor coupled to said read register and said write register,
   and a digital threshold circuit coupled to said second difference subtractor.

2. A moving target cancellation system responsive to a radar system developing video signals during a plurality of range intervals of each of a plurality of range sweeps comprising
   a range counter,
   signal forming means coupled to said radar system range and to said counter for developing a digital video number during each range count, each representative of the amplitude of the video signal of a selected range bin interval,
   a read register storage means, coupled to said storage means
   a write register coupled to said storage means and to said signal forming means,
   timing means coupled to said range counter, to said read register and to said write register for controlling said read and write register for reading data, during each range count interval, of a different range bin interval and writing data of a range bin interval previous to said different range bin interval,
   and a plurality of subtractor means with one coupled to said signal forming means and to said read register and the other subtractor means coupled to said read register and to said write register for each developing, during each range count, a difference signal of respectively higher order and respectively from data received during a range count decreasing by one for each higher order difference.

3. A moving target selection system responsive to a radar system developing video signals during a plurality of range intervals of each of a plurality of range sweeps comprising
   a range counter for counting said range intervals during each range sweep period,
   first means coupled to said range counter and responsive to said video signals for developing digital video numbers representative of the amplitude of the video signal of each selected range bin interval, memory means including read and write control means, a read register coupled to said memory means, a write register coupled to said memory means and to said first means, second means coupled to said range counter and to the read and write control means of said memory means controlling said memory means for data during each range count of a different range bin interval and writing data of a previous range bin interval, first subtractor means coupled to said first means, to said read register and to said write register, and second subtractor means coupled to said read register and to said write register, said first and second subtractor means each developing, during each range count, a difference signal of data from a respectively greater number of range sweeps and respectively from data developed by the radar system during a range count decreasing by one for each higher order difference.

4. A moving target indicator system responsive to digital video data developed by radar means in each range interval of a plurality of range sweeps comprising a range counter for continually defining sequential range intervals during each range sweep, an output register for receiving the digital video data, magnetic core memory means having a word position corresponding to each of the plurality of range intervals, said memory means including means coupled to said range counter for addressing a word corresponding to a predetermined range interval, for reading and addressing a word corresponding to the previous range interval and for writing during each range count, a read register coupled to said memory means, a write register coupled to said memory means and to said output register, a first difference subtractor coupled to said output register and to said read register, a second difference subtractor coupled to said read register and said write register, means coupled from said output register and said first difference subtractor to said write register for entering the data therefrom at the end of each range interval, and a digital threshold circuit coupled to said second difference subtractor.

5. A moving target indicator cancellation system responsive to video signals developed by a radar system during a plurality of range bin intervals repetitive during each of a plurality of range sweep periods comprising first means for developing a digital number representative of the amplitude of the video signal during each range bin interval, memory means operating during each range bin interval for reading stored numbers of data from the range bin interval corresponding to the digital number developed by said first means and for writing numbers of data from the range bin interval previous to the interval of data from said first means, a read register coupled to said memory means, a write register coupled to said memory means and to said first means, first difference subtracting means coupled to said read register and to said first means for developing a first difference number from data of the interval developed by said first means, second difference subtracting means coupled to said read register and to said write register for developing a second difference number representative of the data from the interval previous to the number developed by said first means, and threshold means coupled to said second difference subtracting means for developing a signal representative of a moving target when said second difference number exceeds a selected value.

6. A moving target indicator cancellation system operable with a radar system for determining the presence of a moving target during each range bin interval of a plurality of range bin intervals repetitive during each of a plurality of range sweeps comprising first means for developing a digital video number during each range bin interval representative of the amplitude of the video signal developed by the radar system at a predetermined range bin interval, a magnetic core memory coupled to said first means for reading a stored word of data from a second range bin interval and for writing data from a first range bin interval previous to said second interval, a read register coupled to said memory for storing the data from said second range bin interval, a write register coupled to said memory for writing the data from the first range bin interval, first difference subtracting means coupled to said read register and to said first means for developing a first difference number from data of said second range bin interval, second difference subtractor means coupled to said read register and to said write register for developing a second difference number from data of the first range bin interval, and second means coupled to said second difference subtractor means for developing a signal representative of a moving target during each range bin interval when the second difference number is equal to a selected threshold value.

7. A moving target cancellation system operable with a radar system for determining the presence of a moving target during each of a plurality of range bin intervals, said plurality of range bin intervals being repetitive over each of a plurality of range sweep intervals, said radar system developing a video signal during each range sweep comprising first means for developing a digital number during each range bin interval representative of the amplitude of the video signal developed during that range bin interval, a read register, a write register coupled to said first means, a magnetic memory coupled to said read register and to said write register, said memory storing said digital numbers and first difference numbers representative of the difference between said digital numbers during the same range bin interval over three range sweeps, a first difference subtractor coupled to said read register, to said first means and to said write register for applying a first difference number to said write register representative of the difference between said digital numbers over two range sweep intervals, a second difference subtractor coupled to said read register and to said write register for developing a second difference number representative of the difference between said digital numbers over three range sweep intervals, and second means coupled to said second difference subtractor for developing a signal representative of a moving target when the value of said second difference number is equal to a predetermined value.

8. A moving target indication system responsive to video signals developed by a radar system over a plurality of range intervals repetitive during each of a plurality of range sweeps comprising range counting means for repetitively counting said range intervals over each range sweep interval, detecting means coupled to said range counting means and responsive to said video signal to develop video signals during each range count, analog to digital converter means coupled to said detecting means for developing digital video numbers during each range count representative of the amplitude of said video signals, an output register coupled to said converter means, a magnetic memory having read addressing means and write addressing means, a read register coupled to said memory, a write register coupled to said memory and to said output register, a first difference subtractor coupled to said output register and to said read register for developing a first difference number during each range count representative of the difference of said digital video difference numbers over two consecutive range sweep intervals, a second difference subtractor coupled to said read register and to said write register for developing a second difference number during each range count representative of the difference of said digital video difference numbers over three consecutive range sweep intervals, counting means coupled from said range counting means to said read addressing means and to said write addressing means for developing memory addresses to read from a predetermined address of said memory into said read register, video numbers and first difference numbers corresponding to the range count of information in said output register and, during the subsequent range count, to write into said memory at said predetermined address, video numbers and first difference numbers corresponding to the same range count of the numbers read during the previous range count, and digital threshold detecting means coupled to said second difference subtractor.

9. A moving target selection system responsive to a radar system developing video signals during a plurality of continuously repetitive range bin intervals of each of a plurality of range sweeps comprising first means for developing a digital video number during each range bin interval representative of the amplitude of the video signal during that range bin interval, a read register, a wright register coupled to said first means, memory means coupled to said first means, to said read register and to said write register for reading during each range interval, data of a second range bin interval and writing data of a first range bin interval previous in time to said second range bin interval, said memory means having a plurality of word positions each storing a digital video number, a first difference number and a second difference number, first subtracting means coupled to said read register and to said first means for developing a first difference number of N data, second subtracting means coupled to said read register and to said write register for developing a second difference number of (N−1) data, third subtracting means coupled to said read register and to said write register for developing a third difference number of (N−2) data, second means coupled from said first and second subtracting means and said first means to said write register for storing the video number, said first difference number and said second difference number at the end of each range bin interval, and third means coupled to said third subtracting means for comparing said third difference number to a threshold value.

10. A continuously operating moving target indicator cancellation system operable with a radar system developing video signals during each of a plurality of range bin intervals repetitively over each of a plurality of range sweep intervals comprising first means for developing digital numbers each representing the amplitude of the video signal received during one of said plurality of range bin intervals of each of said plurality of range sweep intervals, a magnetic core memory having a plurality of word positions each corresponding to one of said range bin intervals, a read register coupled to said memory, a write register coupled to said memory and to said first means, counting means coupled to said first means and said memory for addressing a first word position for reading and a second word position for writing during each range bin interval, said second word position corresponding to a range bin interval preceding said first word position, a first difference subtractor coupled to said first means and to said read register for developing a first difference number during each range bin interval representative of the difference of said digital numbers over two range bin intervals, a second difference subtractor coupled to said delay register and to said write register for developing a second difference number during each range bin interval representative of the difference of the digital numbers over three range bin intervals, and second means coupled to said second difference subtractor for providing an indication of a moving target during each range bin interval when the second difference number is equal to or greater than a predetermined threshold value.

11. A moving target indicator cancellation system operable with a radar system having a plurality of range sweep intervals comprising a range counter coupled to radar system for defining a plurality of range intervals during each range sweep interval, first and second box car detectors coupled to said radar system and to said range counter for each charging to the average video value during alternate range intervals, first and second analog to digital converters coupled respectively to said first and second box car detectors for alternately developing digital numbers representative of the amplitude of said video signal, an output register coupled to said first and second converters, a core memory array having a word position corresponding to each range interval, said memory array having a read address register and a write address memory for applying word addresses thereto during read and write cycles, said write register coupled to said output register, address counting means coupled to said range counter, to said address registers of said range counter and to said memory array for controlling reading at a first word address and writing at a second word address corresponding to the preceding range count interval in time, a first difference subtractor coupled to said read register and to said output register for developing during a selected range count interval, a first difference number representative of data from a predetermined range count interval N and applying said first difference number to said write register at the end of said range count interval, said write register storing a video number and a first difference number from range count interval (N−1) for being written into said memory array during said selected range count interval, a delay register coupled to said read register for storing a first difference number from range count interval (N−1), a second difference subtractor coupled to said delay register and to said write register for developing a second difference number representative of numbers from range count interval (N−1), and a threshold circuit coupled to said second difference subtractor for developing a signal indicative of a moving target.

* * * * *

PO-1050
(5/69)

UNITED STATES PATENT OFFICE
CERTIFICATE OF CORRECTION

Patent No. 3,631,488          Dated December 28, 1971

Inventor(s) NOROL T. EVANS

It is certified that error appears in the above-identified patent and that said Letters Patent are hereby corrected as shown below:

Claim 2, Column 10, line 47, after "system" insert

--and to said--;

line 48, delete "and to said";

between lines 51 and 52, insert

--storage means--;

line 52, delete "storage means".

Claim 3, Column 11, line 8, after "memory means" insert

--for--.

Signed and sealed this 22nd day of May 1973.

(SEAL)
Attest:

EDWARD M. FLETCHER, JR.
Attesting Officer

ROBERT GOTTSCHALK
Commissioner of Patents